United States Patent [19]

Sharma

[11] Patent Number: 4,680,228

[45] Date of Patent: Jul. 14, 1987

[54] ADHESION OF RUBBER TO ARAMID CORDS

[75] Inventor: Satish C. Sharma, Mogadore, Ohio

[73] Assignee: GenCorp Inc., Akron, Ohio

[21] Appl. No.: 835,141

[22] Filed: Mar. 3, 1986

[51] Int. Cl.$^4$ .......................... C08L 63/00; C09J 3/14
[52] U.S. Cl. .................... 428/378; 428/395; 525/117; 156/110.1; 156/121; 156/330; 156/331.6
[58] Field of Search ............... 156/110.1, 121, 330, 156/331.6; 428/378, 395; 525/117

[56] References Cited

U.S. PATENT DOCUMENTS

| | | | |
|---|---|---|---|
| 2,817,616 | 12/1957 | Wolfe | 428/393 |
| 3,962,011 | 6/1976 | Van Gils | 156/110 A |
| 3,962,518 | 6/1976 | Wise | 428/395 |
| 3,964,950 | 6/1976 | Boles | 428/395 |
| 4,259,404 | 3/1981 | Van Gils | 428/395 |
| 4,300,972 | 11/1981 | Neubert | 428/395 |
| 4,409,055 | 10/1983 | Elmer | 156/307.5 |
| 4,469,748 | 9/1984 | Sharma | 428/378 |
| 4,557,967 | 12/1985 | Willemsen et al. | 428/224 |
| 4,569,963 | 2/1986 | Hisaki et al. | 428/378 |

FOREIGN PATENT DOCUMENTS 1271883  4/1972  United Kingdom .

*Primary Examiner*—John C. Bleutge
*Assistant Examiner*—David W. Woodward

[57] ABSTRACT

An aqueous composition comprising an alkaline rubbery vinyl pyridine latex, a water dispersible or soluble epoxide and a polyfunctional amine can be used to treat a polyamide reinforcing element, e.g. a poly(p-phenylene terephthalamide) cord, to increase the adhesion of the cord to rubber. Further improvements in adhesion can be obtained if the cord before treatment with the aqueous composition is exposed to a cold gas plasma of air, $N_2$, He, Ne or Ar or mixture thereof at up to about 300 watts of power for a few seconds to several minutes to improve its adhesion to rubber.

24 Claims, No Drawings

ADHESION OF RUBBER TO ARAMID CORDS

This invention relates to the adhesion of aramid reinforcing elements such as cords, fabric or fibers and so forth to rubbers. Good adhesion between KEVLAR (poly)(p-phenylene terephthalamide)) and rubber is extremely important to the performance of KEVLAR reinforced tires. Since greige KEVLAR cord does not adhere well to rubber, an adhesive is applied to KEVLAR cord before embedding the cord in the rubber. The patent literature abounds with adhesive composition suitable for this purpose. Many of the adhesive systems proposed for KEVLAR rubber bonding are two-step systems with the first step consisting of the application of a primer (usually an epoxy resin) followed by the application of a RFL top coat. A one-step adhesive consisting of a phenol-formaldehyde-resorcinol resin in combination with a vinyl pyridine latex can be used for adhering KEVLAR tire cord to rubber.

OBJECTS

An object of this invention is to provide a process for adhering or bonding rubber to aramid fibers or reinforcing elements providing an increased adhesive bond between the aramid fibers and rubber.

Another object is to provide aramid cords, fibers, fabric or reinforcing elements with a minor amount by weight of an adhesive so that subsequently said adhesive coated element may be bonded to rubber.

A further object is to provide a composite of an aramid reinforcing element bonded to a rubber compound.

These and other objects and advantages of the present invention will become more apparent to those skilled in the art from the following detailed description and working examples.

SUMMARY OF THE INVENTION

It has been unexpectedly discovered that a dip containing a vinylpyridine (VP) latex, a water soluble or dispersible epoxide and an amine curing agent provides KEVLAR-RUBBER adhesion equivalent to or better than that obtained with a phenolic based dip adhesive containing phenol-formaldehyde-resorcinol resin and a VP latex. Furthermore, this epoxide-containing one-step dip, when applied to a plasma treated KEVLAR cord, gave even higher adhesions than the corresponding plasma treated cord dipped in the P-F-R VP latex dip adhesive. Additional advantages of this epoxide type dip over the P-T-R VP latex dip are that the former is free of phenol, resorcinol or formaldehyde and does not require pre-reaction of the resin as does the latter.

DISCUSSION OF DETAILS AND PREFERRED EMBODIMENT

The aramid used as a reinforcing element in the practice of the present invention is poly(p-phenylene terephthalamide), e.g.,

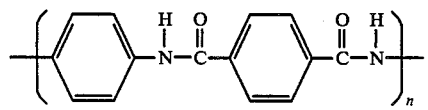

where n is a number. It is known as KEVLAR and is manufactured b the duPont Company. The aramid reinforcing element may be in the form of fibers, continous filaments, staple, tow, yarns, cords (preferred), fabric and so forth.

Aqueous alkaline rubbery vinyl pyridine copolymer latices are well known. See U.S. Pat. Nos. 2,561,215; 2,615,826; 3,437,122; 3,922,422; 3,968,304; 4,145,494; 4,251,409 and 4,285,850. They comprise a copolymer of about 50 to 95% by weight of butadiene-1,3, 5 to 40% by weight of vinyl pyridine, and 0 to 40% by weight of styrene. Examples of suitable vinyl pyridines are 2-vinyl pyridine, 4-vinyl pyridine, 2-methyl-5-vinyl pyridine and 5-ethyl-2-vinyl pyridine. It is usually preferred to use a latex of a terpolymer of from 60 to 80% by weight of butadiene-1,3, from about 7 to 32% by weight of styrene and from about 4 to 22% by weight of 2-vinyl pyridine. Even more preferred is a terpolymer of about 70% by weightof butadiene-1,3, 15% styrene and 15% 2-vinyl pyridine. Mixtures of vinyl pyridine latices can be used. Part of the vinyl pyridine copolymer latex may be replaced with a latex of a butadiene-styrene copolymer and/or a rubbery polybutadiene so long as the relative ratios been the butadiene-1,3, vinyl pyridine and styrene remain as set forth above.

The rubbery vinyl pyridine copolymer and the rubbery polybutadiene or rubbery butadiene copolymer are made in water using free radical catalysts, chelating agents, modifiers, emulsifiers, surfactants, stabilizers, short stopping agents and so forth. They may be hot or cold polymerized, and polymerization may or may not be carried to about 100% conversion. If polymerizations are carried out with appropriate amounts of chain transfer agents or modifiers and conversions are stopped below 100% conversion, low or no gel polymers are possible. Free radical aqueous emulsion polymerization is well known as shown by:

(1) Whitby et al, "Synthetic Rubber," John Wiley & Sons, Inc., New York, 1954;
(2) Schildknecht, "Vinyl and Related Polymers," John Wiley & Sons, Inc., New York, 1952;
(3) "Encyclopedia of Polymer Science and Technology," Interscience Publishers a division of John Wiley & Sons, Inc., New York, Vol. 2 (1965), Vol. 3 (1965), Vol. 5 (1966), Vol. 7 (1967) and Vol. 9 (1968) and
(4) Bovey et al, "Emulsion Polymerization," Interscience Publishers, Inc., New York, 1955.

In addition to the surfactants or wetting agents, and any antioxidants already in the latex, additional surfactants, antioxidants and antidegradants may be added to the resin-latex dip in minor amounts.

The pH of the latex and of the dips should be on the alkaline side, and the pH of any surfactants and stabilizers, including freeze-thaw stabilizers and other additives, should be on the alkaline side or compatible or be neutral to avoid improper coagulation of the latex or latices.

The epoxide, polyepoxide or epoxy resin, comprises an aqueous solution (preferred) or dispersion of from about 0.3 to 20% by weight solids of a water soluble or dispersible epoxide having an average of from about 2 to 4 epoxide groups per molecule. The amount of the epoxide can be adjusted within these limits to obtain the desired viscosity of the dispersion or solution as well as the amount of epoxide to obtain the desired final pickup (after drying) of epoxide solids on the polyamide cord and of course the desired adhesion. The amount of solids of epoxide deposited on the cord can vary from about 0.01 to 2.5% by weight. Examples of suitable epoxides are triglycidyl isocyanurate; 1-epoxyethyl-3,4-epoxycyclo-hexane; vinyl cycolhexene dioxide; ethylene glycol diglycidic ether; 1,2-propanediol diglycidic ether; 1,3-propanediol diglycidic ether; 2,3-butanediol diglycidic ether; and the glycidyl ethers of glycerol, erythritol, pentaerythritol, and sorbitol which contain two to three glycidic groups per molecule, for example, the diglycidyl ether of glycerol (preferred), the triglycidyl ether of hexanetriol and so forth. Still other epoxides can be used such as 3,4-epoxycyclohexyl methyl-3,4-epoxy cyclohexane carboxylate; 3-(3,4-epoxycyclohexane)-8,9-epoxy-2,4-dioxaspiro[5,5]-undecane; bis(2,3-epoxycyclopentyl)ether; bis(3,4-epoxy-6-methylcyclohexyl methyl) adipate; the diglycidyl ether of polyethylene glycol 400; polyallyl glycidyl ether; the diglycidyl ether of bisphenol A; epoxy resorcinol ethers and the like. These epoxides have a molecular weight of up to about 600. Preferred are the water soluble polyglycidyl ethers including the polyhydroxylated saturated aliphatic hydrocarbons of from 2 to 10 carbon atoms, especially those from hydrocarbons having from 2 to 3 hydroxyl groups. Mixtures of these epoxides can be used. These materials are generally well known and can be made by methods disclosed in the prior art as shown by:

(a) "Encyclopedia of Chemical Technology," 2nd Ed., Kirk-Othmer, Volume 8, Interscience Publishers a division of John Wiley & Sons, Inc., New York, 1965, pages 238 to 312;

(b) "Encyclopedia of Polymer Science and Technology," Interscience Publishers a division of John Wiley & Sons, Inc., New York, Volume 1, 1964, Pages 854 to 856 and Volume 6, 1967, pages 83 to 102 and 209 to 230.

(c) "Cyclic Monomers," Frisch, Wiley-Interscience a division of John Wiley & Sons, Inc., New York, 1972, pages 1 to 54;

(d) "Epoxy Resins," Lee and Neville, McGraw-Hill Book Company, Inc., New York, 1957 and (e) "Handbook of Epoxy Resins," Lee and Neville, McGraw-Hill Book Company, New York, 1967.

Surfactants can be added to the epoxide dispersion or solution to facilitate mixing and cord pick-up. Also, NaOH or NH$_4$OH may be added to the epoxide to maintain an alkaline condition.

Water soluble or water dispersible amines which are well known to the art are used as curing agents for the epoxides. Examples of such amines are polyfunctional primary and secondary amines and some tertiary amines including, for example, diethylene triamine, triethylene tetramine, dicyandiamide, melamine, pyridine, cyclohexylamine, benzyldimethylamine, benzylamine, diethylaniline, triethanolamine, piperidine, tetramethyl piperazine, N,N-dibutyl-1,3-propane diamine, N,N-diethyl-1,3-propane diamine, 1,2-diamino-2-methylpropane, 2,3-diamino-2-methylbutane, 2,4-diamino-2-methylpentane, 2-diamino-2,6-dimethyloctane, dibutylamine, dioctylamine, dinonylamine, distearylaine, diallyl amine, dioleylamine, dicyclohexylamine, methylethylamine, ethylcyclohexylamine, o-tolylnaphthylamine, pyrrolidine, 2-methylpyrrolidine, tetrahydropyridine, 2-methylpiperidine, 2,6-dimethylpiperidine, diaminopyridine, tetraethylene pentamine and metaphenylene diamine. Polyoxyalkyleneamines, also, can be used as well as polyethylenimines. Particularly preferred as being effective in this invention are epoxide curing agents such as diethylene triamine, triethylene tetramine, tetraethylene pentamine, polyethylene imine and m-phenylene diamine. Mixtures of said amines can be used.

The epoxide amine curing agent is used in an amount at least sufficient to cure the epoxide. This is to signify that the amount used is not less than that quantity generally used by those skilled in the art to fully cure the amount of epoxide compound in the latex. Generally speaking, epoxide curing agents are calculated stoichiometrically on the basis of one active hydrogen in the agent for each epoxy group. It is preferred, however, to add an excess of curing agent to insure complete curing of the epoxide. The epoxide curing agent is merely stirred or emulsified into the latex. During curing of the epoxide compound, there may be some cross-linking with the vinyl pyridine copolymer however the extent of this reaction is not known.

Water is used in the adhesive epoxide-amine-latex dip in an amount sufficient to provide for the desired dispersion of the rubber or latex particles, and for the solution of the epoxide, amine and any other additives, to obtain the desired viscosities, and for the proper solids content to get the necessary pickup of solids on and penetration between the fibers of the cord. The amount of water in the adhesive cord dip generally may vary so as to provide a solids content of from about 10 to 50%, preferably from about 15 to 25%, by weight. Too much water may require use of excess heat to evaporate the water on drying. Too little water may cause uneven penetration or too slow coating speeds.

On a dry weight basis the epoxide is used in an amount of about 10 to 30 parts by weight per 100 parts by weight of the rubber of the latex of the dip. Also, on a dry weight basis the amine is used in an amount of from about 2 to 8 parts by weight per 100 parts by weight of the rubber of the latex of the dip.

Prior to dipping in the epoxide-amine vinyl pyridine latex aqueous adhesive dip, the aramid reinforcing cord can be treated desirably with a cold gas plasma of air, N$_2$, He, Ne or Ar or mixture thereof at from about 10 to 300 watts of power for from about 2 seconds to 30 minutes or more to improve further adhesion of the aramid cord. An argon plasma is preferred. In this connection please see U.S. Pat. No. 4,469,748, the disclosure of which is incorporated herein and made a part hereof by reference to the same.

To apply the epoxide-amine-latex dip to the untreated or plasma treated aramid fiber cords in a reliable manner, the cords are fed through the adhesive dip while being maintained under a small predetermined tension and into a drying oven where they are dried under a small predetermined tension (to prevent sagging without any appreciable stretching). As the cords leave the oven they enter a cooling zone where they are air cooled before the tension is released. In each case the adhesive-coated cords leaving the dip are dried (cured or heat set) in the oven at from about 200° to 600 F. (93.3° to 315.6° C.) for from about 300 to 5 seconds. The time the cord remains in the adhesive is about a few seconds or more or at least for a period of time sufficient to allow wetting of the cord and at least some impregnation of the fibers of the cord. Successive treatments if desired, e.g., dipping, predrying and drying with the epoxide/amine/latex dips, may be conducted in the same fashion. More than one dipping tank and more than one drying oven can be used.

The single-cord H-pull, H-adhesion, test is employed to determine the static adhesion of the dried (heat set or cured) adhesive coated aramid fiber cords to rubber. In each case the rubber test specimens are made from a vulcanizable rubber composition comprising rubber, reinforcing carbon black and the customary compounding and curing ingredients. The cords to be tested are placed in parallel positions in a multiple-strand mold of the type described in the single-cord H-pull adhesion test ASTM designated D 2138-72, the mold is filled with the unvulcanized rubber composition, the cords being maintained under a tension of 50 grams each, and the rubber is cured. Each rubber test specimen is ¼ inch thick and has a ⅜ inch cord embedment. After the rubber has been cured, the hot cured rubber piece is removed from the mold and cooled, and H-test specimens are cut from said piece. The specimens are then aged at least 16 hours at room temperature. The force required to separate the cord from the rubber is then determined at room temperature (about 25° C.) using an INSTRON tester provided with specimen grips. For hot adhesion testing samples are conditioned at 121° C. for 15 minutes before pulling. The maximum force in pounds required to separate the cord from the rubber is the H-adhesion value. All the data submitted in the working examples which follow are based upon identical test conditions, and all of the test specimens were prepared and tested in the same way generally in accordance with ASTM Designation: D 2138-72.

Aramid cords or fabric coated with the adhesive dips of the present invention can have up to about 20%, preferably up to about 15%, total by weight (dry) solids (pick up) of the adhesive dip on the cord based on the weight of the cord and can be used in the manufacture of carcasses, belts, flippers and chafers of radial, bias, or belted-bias passenger tires, truck tires, motorcycle tires, off-the-road tires and airplane tires, and, also, in making transmission belts, V-belts, conveyor belts, hose, gaskets, tarpaulins and the like.

While the adhesive containing aramid fiber reinforcing element can be adhered to vulcanizable natural rubber, rubbery butadiene-styrene copolymer or rubbery polybutadiene or blend thereof by curing the same in combination together, it is apparent that the heat cured adhesive containing aramid fiber reinforcing element can be adhered to other vulcanizable rubbery materials, by curing or vulcanizing the same in combination with the rubber, such as one or more of the foregoing rubbers as well as nitrile rubbers, chloroprene rubbers, polyisoprenes, acrylic rubbers, isoprene-acrylonitrile rubbers and the like and mixtures of the same. These rubbers can be mixed with the usual compounding ingredients including sulfur, stearic acid, zinc oxide, zinc stearate, magnesium oxide, silica, carbon black, accelerators, antioxidants, antidegradants and other curatives, rubber compounding ingredients and the like well known to those skilled in the art for the particular rubbers being employed.

The following examples will serve to illustrate the present invention with more particularly to those skilled in the art. In these examples parts are parts by weight unless otherwise noted.

EXAMPLE 1

A cord dip was prepared according to the recipe shown in Table I, below:

TABLE I
RECIPE FOR ONE-STEP EPOXY DIP FOR ARAMID FIBER*

| | Parts Wet | Dry |
|---|---|---|
| Latex** | 244 | 100 |
| Deionized Water | 166 | — |
| Epoxide*** | 160 | 16 |
| Tetraethylene pentamine (10%) | 30 | 3 |
| Total | 600 | 119 |
| TSC | = Ca 20% by weight | |

Dip-aged overnight before use.
*The aramid tire cord used in the dips was KEVLAR, (3000/2, poly(p-phenylene terephthalamide)) greige tire cord,

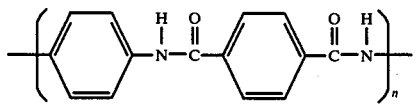

where n is a number, duPont.
**About 70/15/15 butadiene-1,3/styrene/2-vinyl pyridine terpolymer aqueous alkaline free radical polymerized latex (41% solids).
***Nagase & Co., Ltd., Osaka, Japan, NER-010A, water soluble glycerol diglycidyl ether,

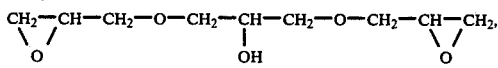

epoxy content: 153 (WPE, weight per equivalent).

EXAMPLE II

KEVLAR cords were dipped in the one-step cord dip shown in Table I, above, at 1 lb. dip tension, pre-dried at 225° F./120 seconds and cured at 475° F./75 seconds and 5 lbs. tension. After drying and curing the cords were embedded ⅜" in the following rubber compound which then was vulcanized at 20 tons ram pressure at 307° F. for 30 minutes. Variations were made in drying the dipped cords.

| Rubber Compound | |
|---|---|
| Material | Parts By Weight |
| Natural Rubber | 46.5 |
| SBR-1551 (free radical aqueous emulsion, cold polymerized, copolymer of butadiene-1,3 and styrene, target bound styrene of 23.5%, nominal Mooney viscosity ML 1 + 4 (212° F.) of 52) | 38.5 |
| Polybutadiene (stereospecific, solution polymerized, 92-93% cis, nominal Mooney viscosity ML 1 + 4 at 100° C. of 45-47) | 15.0 |
| Fast extruding furnace carbon black | 45.0 |
| Precipitated hydrated amorphous silica (Hi-Sil 210, PPG Industries) | 15.0 |
| Oil, highly aromatic | 5.0 |
| Zinc oxide | 3.0 |
| Stearic acid | 1.5 |
| Antioxidant (BLE, high-temperature reaction product of diphenyl amine and acetone, Uniroyal Chemical) | 2.7 |
| COHEDUR RL (a mixture of resorcinol and COHEDUR A, which is the hexa or pentamethyl ether of hexamethylol melamine, with a small amount of dibutyl phthalate plasticizer for viscosity control. Naftone, Inc.) | 4.7 |
| SANTOCURE NS (N—t-butyl-2-benzothiazolesulfenamide, Monsanto, Rubber Chemicals Div.) | 1.2 |
| Sulfur (80% sulfur in oil, CRYSTEX, Stauffer Chem.) | 3.0 |

The results of the rubber embedded dipped cords on testing are shown in Table II, below:

TABLE II

ADHESION OF KEVLAR CORD TO RUBBER EFFECT OF DIP CURING CONDITIONS

| Dip Used | Dip Curing Conditions | H-Adhesion at RT (Ca 25° C.) (Newtons) |
|---|---|---|
| Comparative Dip | 475° F., 75 seconds | 279 |
| Above-One Step Epoxy Type | 460° F., 75 seconds | 322 |
| | 475° F., 75 seconds | 332 |
| | 490° F., 75 seconds | 321 |

Comparative Dip: Phenol and formaldehyde were reacted in $H_2O$ with NaOH for from 1 to 16 hours to form a resin having unreacted $H_2CO$ to which was added resorcinol and the 70/15/15 butadiene/styrene/vinyl pyridine terpolymer latex to form a cord dip according to U.S. Pat. No. 4,040,999. No pre-reaction time was required when using the epoxide and amine curing agent. Also, the epoxy based dip does not use formaldehyde which may be a possible health hazard.

EXAMPLE III

KEVLAR greige tire cords (see Table I, above) were treated in an argon plasma at 50 watts and at a flow rate of about 30 ml/minute in accordance with the method described in U.S. Pat. No. 4,469,748. Some of the plasma treated cords were then dipped in the one-step KEVLAR dip shown in Table I, above. Other plasma treated cords were dipped in the comparative dip shown in Example II, above. The dipped cords were then predried at 1 lb. dip tension at 225° F./120 seconds and cured at 475° F./75 seconds at 5 lbs. tension. The dried and dipped cords were then embedded in the rubber compound and cured as shown in Example II, above. Results on H-adhesion testing are shown in Table III, below.

TABLE III

ADHESION OF KEVLAR CORD TO RUBBER EFFECT OF DIP TYPE AND PLASMA TREATMENT

| Dip Used | Plasma Treatment Time (Minutes) | H-Adhesion at RT (Newtons) |
|---|---|---|
| Comparative Dip (Example II, above) | 0 | 339 |
| | 5 | 280 |
| | 10 | 345 |
| | 20 | 362 |
| | 30 | 371 |
| Above-one step Epoxy Type | 0 | 338 |
| | 5 | 378 |
| | 10 | 387 |
| | 20 | 395 |
| | 30 | 383 |

Greige KEVLAR tire cords were treated with various gas plasmas (argon+pyridine, argon+triethylamine and argon+n-butylamine and dipped in the comparative dip and the above one-step epoxy type dip, dried, cured, embedded in rubber, vulcanized and tested following the procedures of the above examples. For both dips, the argon plasma treatment alone gave higher H-adhesions than those with the other plasma combinations. The data in the tables show that the epoxy type dip gave at least as good adhesions as those of the comparative dip when both were applied to the greige KEVLAR cord. When the two dips were compared using KEVLAR cords that had been plasma treated for various lengths of time, the adhesions were higher for the epoxy type dip than those for the corresponding cords treated with the comparative dip.

EXAMPLE IV

Additional runs were made using the same rubber compound, the same vinyl pyridine latex, the same greige KEVLAR 3000/2 cord, the same amine curing agent, the same curing conditions and the same amount of water to form the dips as shown in Examples I and II, above. The results obtained on testing the cords are shown below in Tables IV and V:

TABLE IV

EFFECT OF EPOXY/AMINE AND RESIN/LATEX RATIO ON ADHESION

| Run No. | Epoxy*/Amine Parts by wt, Dry Basis | Resin[1]/Latex Parts by wt, Dry Basis | H-Adhesion (Newtons) RT | 121° C. |
|---|---|---|---|---|
| 10 | 16/4 | 20/100 | 335 | 218 |
| 11 | 18.1/6.9 | 25/100 | 331 | 213 |
| 12 | 14.4/5.6 | 20/100 | 343 | 199 |
| 13 | 20/5 | 25/100 | 343 | 218 |
| 14 | 17.3/5.2 | 22.5/100 | 353 | 214 |
| 15 | 16.8/0 | 16.8/100 | 300 | — |
| 16 | 16.8/3.2 | 20/100 | 328 | — |
| 17 | 15.4/4.6 | 20/100 | 311 | — |
| 18 | 14.0/6.0 | 20/100 | 272 | — |

*NER-010A
[1]Epoxy + Amine = Resin

The data in Table IV show the effect of epoxy/amine and resin/latex ratios on adhesion. From the data for Runs 10 to 14 it can be concluded that in the range studied, the resin/latex ratio does not have any significant effect on adhesion. By combining the data from Runs 10 to 18 it is further concluded that good adhesion can be obtained even without the use of the amine curing agent. The addition of the curing agent gives about 10% improvement in adhesion but large amounts of curing agent may be detrimental to adhesion.

TABLE V

EFFECT OF DIP AGING TIME ON KEVLAR-RUBBER ADHESION

| Run No. | Epoxy Resin Used | Dip* Aging Time (Hours) | H-Adhesion (Newtons) RT |
|---|---|---|---|
| 20 | NER-010A | 2 | 327 |
| 21 | NER-010A | 4 | 321 |
| 22 | NER-010A | 96 | 299 |
| 23 | G 1701** | 2 | 314 |
| 24 | G 1701** | 4 | 331 |
| 25 | G 1701** | 96 | 343 |

*Epoxy/Amine ratio of the dip was 15.4/4.6 parts by weight, dry basis.
**Glycidylether of Glycerine from EMS-CHEMIE AG of Switzerland, water soluble, epoxy equivalent weight of 139-149.

The data in Table V show that an aging time of only 2 hours is sufficient to obtain near optimum adhesion for the epoxy dip. Often, tire cord adhesive dips require overnight aging (maturing) to obtain optimum adhesion. The data in Table V also show that the epoxy resin G 1701 is as effective as NER-010A in this adhesive application.

The rubber, KEVLAR, amine and latex used were the same as in the previous examples.

I claim:
1. A method for adhering a poly(p-phenylene terephthalamide) reinforcing element to a rubber compound which comprises (I) treating said element with a composition comprising an aqueous alkaline dispersion of from about 10 to 50%, by weight of solids comprising (a) at least one rubbery vinyl pyridine copolymer latex, (b) at least one water soluble or dispersible epoxide having an average of from about 2 to 4 epoxide groups per molecule and (c) a water soluble or dispersible polyfunctional amine curing agent selected from the group consisting of primary, secondary and tertiary amines and mixtures of said amines, (b) being used in an amount of from about 10 to 30 parts by weight per 100 parts by weight of (a) on a dry weight basis and (c) being used in an amount of from about 2 to 8 parts by weight per 100 parts by weight of (a) on a dry weight basis, heating said treated element at a temperature of from about 200° to 600° F. for from about 300 to 5 seconds to remove essentially all of the water from said composition and to provide said element with a heat cured or heat set dry adhesive in an amount of up to about 20%, total by weight (dry) based on the weight of said reinforcing element, and (II) combining said dried and heat cured adhesive containing reinforcing element with an unvulcanized vulcanizable rubber compound and vulcanizing the same.

2. A method according to claim 1 where said vinyl pyridine copolymer is a copolymer of from about 50 to 95% by weight of butadiene-1,3, from 5 to 40% by weight of a vinyl pyridine and 0 to 40% by weight of styrene.

3. A method according to claim 2 where said vinyl pyridine copolymer is a terpolymer of about 70% by weight of butadiene-1,3, 15% by weight of styrene and 15% by weight of 2-vinyl pyridine, said epoxide is glycerol diglycidyl ether and said amine is tetraethylene pentamine.

4. A method according to claim 1 where said reinforcing element before treatment with said composition is treated in a cold gas plasma for from about 2 seconds to 30 minutes at from about 10 to 300 watts of power and where said gas is selected from the group consisting of air, nitrogen, helium, neon and argon and mixture thereof.

5. A method according to claim 4 where said vinyl pyridine copolymer is a terpolymer of from about 60 to 80% by weight of butadiene-1,3, from about 7 to 32% by weight of styrene and from about 4 to 22% by weight of 2-vinyl pyridine.

6. A method according to claim 5 where said vinyl pyridine copolymeer is a terpolymer of about 70% by weight of butadiene-1,3, 15% by weight of styrene and 15% by weight of 2-vinyl pyridine, said epoxide is glycerol diglycidyl ether, said amine is tetraethylene pentamine and said gas is argon.

7. A method which comprises treating a poly)p-phenylene terephthalamide) reinforcing element with a composition comprising an aqueous alkaline dispersion of from about 10 to 50%, preferably from about 15 to 25%, by weight of solids comprising (a) at least one rubbery vinyl pyridine copolymer latex, (b) at least one water soluble or dispersible epoxide having an average of from about 2 to 4 epoxide groups per molecule and (c) a water soluble or dispersible polyfunctional amine curing agent selected from the group consisting of primary, secondary and tertiary amines and mixtures of said amines, (b) being used in an amount of from about 10 to 30 parts by weight per 100 parts by weight of )a) on a dry weight basis and (c) being used in an amount of from about 2 to 8 parts by weight per 100 parts by weight of (a) on a dry weight basis, heating said treated element at a temperature of from about 200° to 600° F. for from about 300 to 5 seconds to remove essentially all of the water from said composition and to provide said element with a heat cured or heat set dry adhesive in an amount of up to about 20%, total by weight (dry) based on the weight of said reinforcing element.

8. A method according to claim 7 where said vinyl pyridine copolymer is a copolymer from about 50 to 95% by weight of butadiene-1,3, from 5 to 40% by weight of a vinyl pyridine and 0 to 40% by weight of styrene.

9. A method according to claim 8 where said vinyl pyridine copolymer is a terpolymer of about 70% by weight of butadiene-1,3, 15% by weight of styrene and 15% by weight of 2-vinyl pyridine, said epoxide is glycerol diglycidyl ether and said amine is tetraethylene pentamine.

10. A method according to claim 7 where said reinforcing element before treatment with said composition is treated in a cold gas plasma for from about 2 seconds to 30 minutes at from about 10 to 300 watts of power and where said gas is selected from the group consisting of air, nitrogen, helium, neon and argon and mixtures thereof.

11. A method according to claim 10 where said vinyl pyridine copolymer is a terpolymer of from about 60 to 80% by weight of butadiene-1,3, from about 7 to 32% by weight of styrene and from about 4 to 22% by weight of 2-vinyl pyridine.

12. A method according to claim 11 where said vinyl pyridine copolymer is a terpolymer of about 70% by weight of butadiene-1,3, 15% by weight of styrene and 15% by weight of 2-vinyl pyridine, said epoxide is glycerol diglycidyl ether, said amine is tetraethylene pentamine and said gas is argon.

13. A bonded composite material comprising a poly(p-phenylene terephthalamide) reinforcing element embedded in a vulcanized rubber, said element containing up to about 20%, by weight (dry) based on the weight of said element of a heat cured or heat set adhesive composition comprising (a) at least one rubbery vinyl pyridine copolymer, (b) at least one epoxide have an average of from 2 to 4 epoxide groups per molecule and (c) a polyfunctional amine curing agent selected from the group consisting of primary, secondary and tertiary amines and mixtures of said amines, (b) being used in an amount of from about 10 to 30 parts by weight per 100 parts by weight of (a) and (c) being used in an amount of from about 2 to 8 parts by weight per 100 parts by weight of (a).

14. A bonded composite material according to claim 13 where said vinyl pyridine copolymer is a copolymer of from about 50 to 95% by weight of butadiene-1,3, from 5 to 40% by weight of a vinyl pyridine and 0 to 40% by weight of styrene.

15. A bonded composite material according to claim 14 where said vinyl pyridine copolymer is a terpolymer of about 70% by weight of butadiene-1,3, 15% by weight of styrene and 15% by weight of 2-vinyl pyridine, said epoxide is glycerol diglycidyl ether and said amine is tetraethylene pentamine.

16. A bonded composite material according to claim 13 where said poly(p-phenylene terephthalamide) reinforcing element has been initially treated in a cold gas plasma for from about 2 seconds to 30 minutes at from about 10 to 300 watts of power and where said gas is selected from the group consisting of air, nitrogen, helium, neon and argon and mixtures thereof.

17. A bonded composite material according to claim 16 where said vinyl pyridine copolymer is a terpolymer of from about 60 to 80% by weight of butadiene-1,3, from about 7 to 32% by weight of styrene and from about 4 to 22% by weight of 2-vinyl pyridine.

18. A bonded composite material according to claim 17 where said vinyl pyridine copolymer is a terpolymer of about 70% by weight of butadiene-1,3, 15% by weight of styrene and 15% by weight of 2-vinyl pyridine, said epoxide is glycerol diglycidyl ether, said amine is tetraethylene pentamine and said gas is argon.

19. A poly(p-phenylene terephthalamide) reinforcing element containing up to about 20%, by weight (dry) based on the weight of said element of a heat cured or heat set adhesive composition comprising (a) at least one rubbery vinyl pyridine copolymer, (b) at least one epoxide have an average of from 2 to 4 epoxide groups per molecule and (c) a polyfunctional amine curing agent selected from the group consisting of primary, secondary and tertiary amines and mixtures of said amines, (b) being used in an amount from about 10 to 30 parts by weight per 100 parts by weight of (a) and (c) being used in an amount of from about 2 to 8 parts by weight per 100 parts by weight of (a).

20. A reinforcing element according to claim 19 where said vinyl pyridine copolymer is a copolymer of from about 50 to 95% by weight of butadiene-1,3, from 5 to 40% by weight of a vinyl pyridine and 0 to 40% by weight of styrene.

21. A reinforcing element according to claim 20 where said vinyl, pyridine copolymer is a terpolymer of about 70% by weight of butadiene-1,3, 15% by weight of styrene and 15% by weight of 2-vinyl pyridine, said epoxide is glycerol diglycidyl ether and said amine is tetraethylene pentamine.

22. A reinforcing element according to claim 19 where said reinforcing element has been initially treated in a cold gas plasma for from about 2 seconds to 30 minutes at from about 10 to 300 watts of power and where said gas is selected from the group consisting of air, nitrogen, helium, neon and argon and mixtures thereof.

23. A reinforcing element according to claim 22 where said vinyl pyridine copolymer is a terpolymer of from about 60 to 80% by weight of butadiene-1,3, from about 7 to 32% by weight of styrene and from about 4 to 22% by weight of 2-vinyl pyridine.

24. A reinforcing element according to claim 23 where said vinyl pyridine copolymer is a terpolymer of about 70% by weight of butadiene-1,3, 15% by weight of styrene and 15% by weight of 2-vinyl pyridine, said epoxide is glycerol diglycidyl ether, said amine is tetraethylene pentamine and said gas is argon.

* * * * *